(12) United States Patent
L'Esperance et al.

(10) Patent No.: US 10,726,178 B1
(45) Date of Patent: Jul. 28, 2020

(54) FUNCTIONAL LOGIC CONE SIGNATURE GENERATION FOR CIRCUIT ANALYSIS

(71) Applicant: INTERNATIONAL BUSINESS MACHINES CORPORATION, Armonk, NY (US)

(72) Inventors: Nicholai L'Esperance, Underhill, VT (US); Adisun Wheelock, Winooski, VT (US); Robert Cory Redburn, Richmond, VT (US); Andrew Turner, Underhill, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/519,285

(22) Filed: Jul. 23, 2019

(51) Int. Cl.
| | |
|---|---|
| *G06F 30/327* | (2020.01) |
| *H04L 9/06* | (2006.01) |
| *G01R 31/3177* | (2006.01) |
| *G06F 30/3323* | (2020.01) |

(52) U.S. Cl.
CPC ....... *G06F 30/327* (2020.01); *G01R 31/3177* (2013.01); *G06F 30/3323* (2020.01); *H04L 9/0643* (2013.01)

(58) Field of Classification Search
CPC .............. G06F 30/327; G06F 30/3323; G01R 31/3177; H04L 9/0643
USPC ....................................................... 716/104
See application file for complete search history.

(56) References Cited

U.S. PATENT DOCUMENTS

| | | | |
|---|---|---|---|
| 6,009,252 A | 12/1999 | Lipton | |
| 6,301,687 B1 | 10/2001 | Jain et al. | |
| 6,408,424 B1 | 6/2002 | Mukherjee et al. | |
| 6,457,162 B1 | 9/2002 | Stanion | |
| 7,373,618 B1 | 5/2008 | Khoo et al. | |
| 8,296,695 B1 * | 10/2012 | Chen | G06F 30/327 716/103 |

(Continued)

OTHER PUBLICATIONS

Imagination Technologies LTD, "Method and apparatus for use in the design and manufacture of integrated circuits," United Kingdom Patent Application No. GB-201106055-D0, Filed Apr. 8, 2011.

(Continued)

*Primary Examiner* — Suresh Memula
(74) *Attorney, Agent, or Firm* — Cantor Colburn LLP; Erik Johnson

(57) ABSTRACT

Methods, systems and computer program products for generating a functional logic cone signature for circuit analysis are provided. Aspects include for each of a plurality of portions of a circuit diagram of a circuit, tracing the respective portion of the circuit diagram to identify circuit components associated with the respective portion of the circuit diagram from a starting latch to one of one or more source latches. Circuit components include circuit elements and circuit connections. Aspects include generating an ASCII representation of the respective identified circuit components for each of the plurality of portions of the circuit diagram of the circuit. Aspects include generating a plurality of hash values by applying a hashing function to each ASCII representation. Each hash value corresponds to one of the plurality of portions of the circuit diagram. Aspects also include storing the hash values in a data structure.

20 Claims, 13 Drawing Sheets

(56) References Cited

U.S. PATENT DOCUMENTS

2008/0072111 A1\* 3/2008 Le .................. G01R 31/318502
                                                                                 714/726
2016/0357882 A1\* 12/2016 Dosluoglu ............ G06F 30/327

OTHER PUBLICATIONS

Krishnaswamy et al., "Signature-based SER Analysis and Design of Logic Circuits," IEEE Transactions on Computer-Aided Design of Integrated Circuits and Systems, vol. 28, No. 1, Jan. 2009, pp. 74-86.

\* cited by examiner

Elements (nodes, format: cellname:<id>):
INV:0          attributes (vt=L,....)
AND2:0         attributes (vt=H, inputs=2,....)

Connections (edges):
LATCH:0.D <= INV:0.Y
INV:0.X <= AND2:0.C
AND2:0.A <= LATCH:1.Q
AND2:0.B <= LATCH:2.Q Elements (nodes, format: cellname:driver strength:fanout:<id>):
INV:L:1:0    attributes (vt=L, fanout=1)
AND2:H:2:0   attributes (vt=H, fanout=2)

Connections (edges):
LATCH:0.D <= INV:L:1:0.Y
INV:L:1:0.X <= AND2:H:2:0.C
AND2:H:2:0.A <= LATCH:1.Q
AND2:H:2:0.B <= LATCH:2.Q Trace:
AND2:0.A => AND2:1.C
AND2:1.A => INV:0.Y

FUNCTIONAL LOGIC CONE SIGNATURE GENERATION FOR CIRCUIT ANALYSIS

BACKGROUND

The present invention generally relates to integrated circuits, and more specifically, to generating a functional logic cone signature for circuit analysis.

Integrated circuits generally include a large number of circuit components, such that the design of such circuits may be very large and complicated. On occasion, one or more components of an integrated circuit may experience failures and it is generally desirable to identify the source of such failures so that the circuit may be repaired or redesigned. Current approaches for attempting to detect systemic failures among circuit designs include core stacking and name masking, which rely on patterns in observation latch names.

SUMMARY

Embodiments of the present invention are directed to a computer-implemented method for generating a functional logic cone signature for circuit analysis. A non-limiting example of the computer-implemented method includes tracing, for each of a plurality of portions of a circuit diagram of a circuit, the respective portion of the circuit diagram to identify circuit components associated with the respective portion of the circuit diagram from a starting latch to one of one or more source latches. The circuit components include circuit elements and circuit connections. The method also includes generating an ASCII representation of the respective identified circuit components for each of the plurality of portions of the circuit diagram of the circuit. The method also includes generating a plurality of hash values by applying a hashing function to each ASCII representation. Each hash value corresponds to one of the plurality of portions of the circuit diagram. The method also includes storing the hash values in a data structure.

Embodiments of the present invention are directed to a system for generating a functional logic cone signature for circuit analysis. The system includes a memory having computer readable computer instructions, and a processor for executing the computer readable instructions. The computer readable instructions include instructions for tracing, for each of a plurality of portions of a circuit diagram of a circuit, the respective portion of the circuit diagram to identify circuit components associated with the respective portion of the circuit diagram from a starting latch to one of one or more source latches. The circuit components include circuit elements and circuit connections. The computer readable instructions also include instructions for generating an ASCII representation of the respective identified circuit components for each of the plurality of portions of the circuit diagram of the circuit. The computer readable instructions also include instructions for generating a plurality of hash values by applying a hashing function to each ASCII representation. Each hash value corresponds to one of the plurality of portions of the circuit diagram. The computer readable instructions also include instructions for storing the hash values in a data structure.

Embodiments of the invention are directed to a computer program product for generating a functional logic cone signature for circuit analysis, the computer program product comprising a computer readable storage medium having program instructions embodied therewith. The computer readable storage medium is not a transitory signal per se. The program instructions are executable by a processor to cause the processor to perform a method. A non-limiting example of the method includes tracing, for each of a plurality of portions of a circuit diagram of a circuit, the respective portion of the circuit diagram to identify circuit components associated with the respective portion of the circuit diagram from a starting latch to one of one or more source latches. The circuit components include circuit elements and circuit connections. The method also includes generating an ASCII representation of the respective identified circuit components for each of the plurality of portions of the circuit diagram of the circuit. The method also includes generating a plurality of hash values by applying a hashing function to each ASCII representation. Each hash value corresponds to one of the plurality of portions of the circuit diagram. The method also includes storing the hash values in a data structure.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
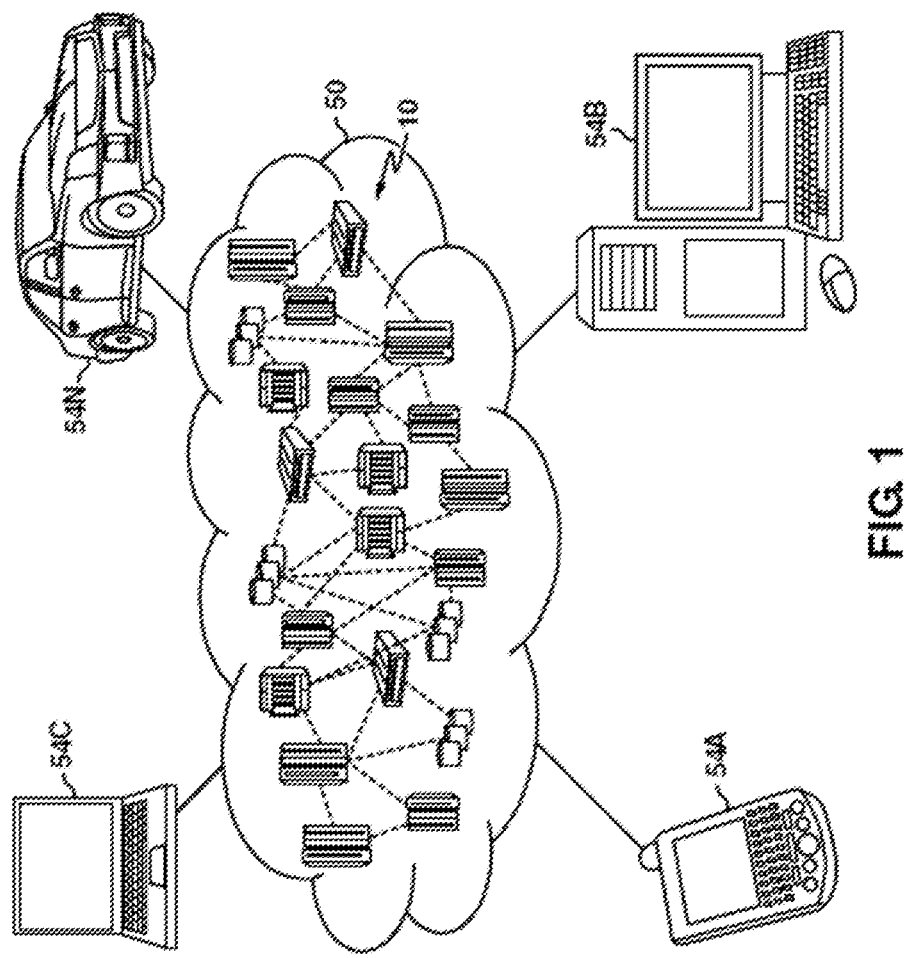
FIG. 1 depicts a cloud computing environment according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
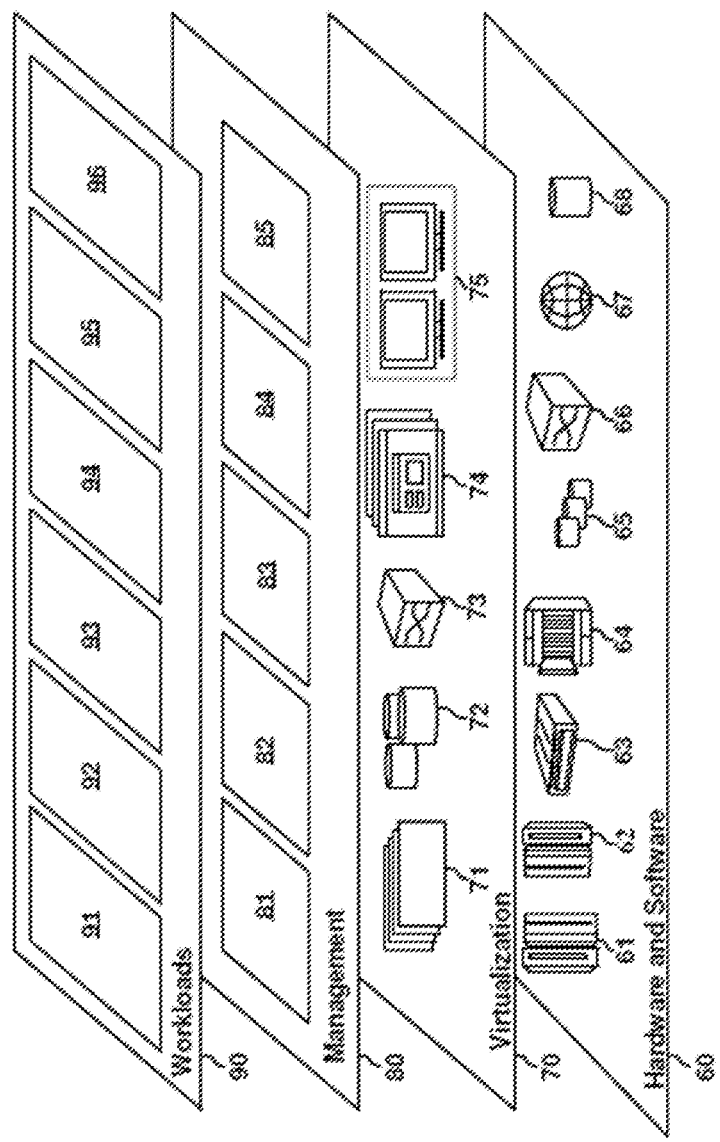
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a functional logic cone signature for circuit analysis 96.

Figure 3:
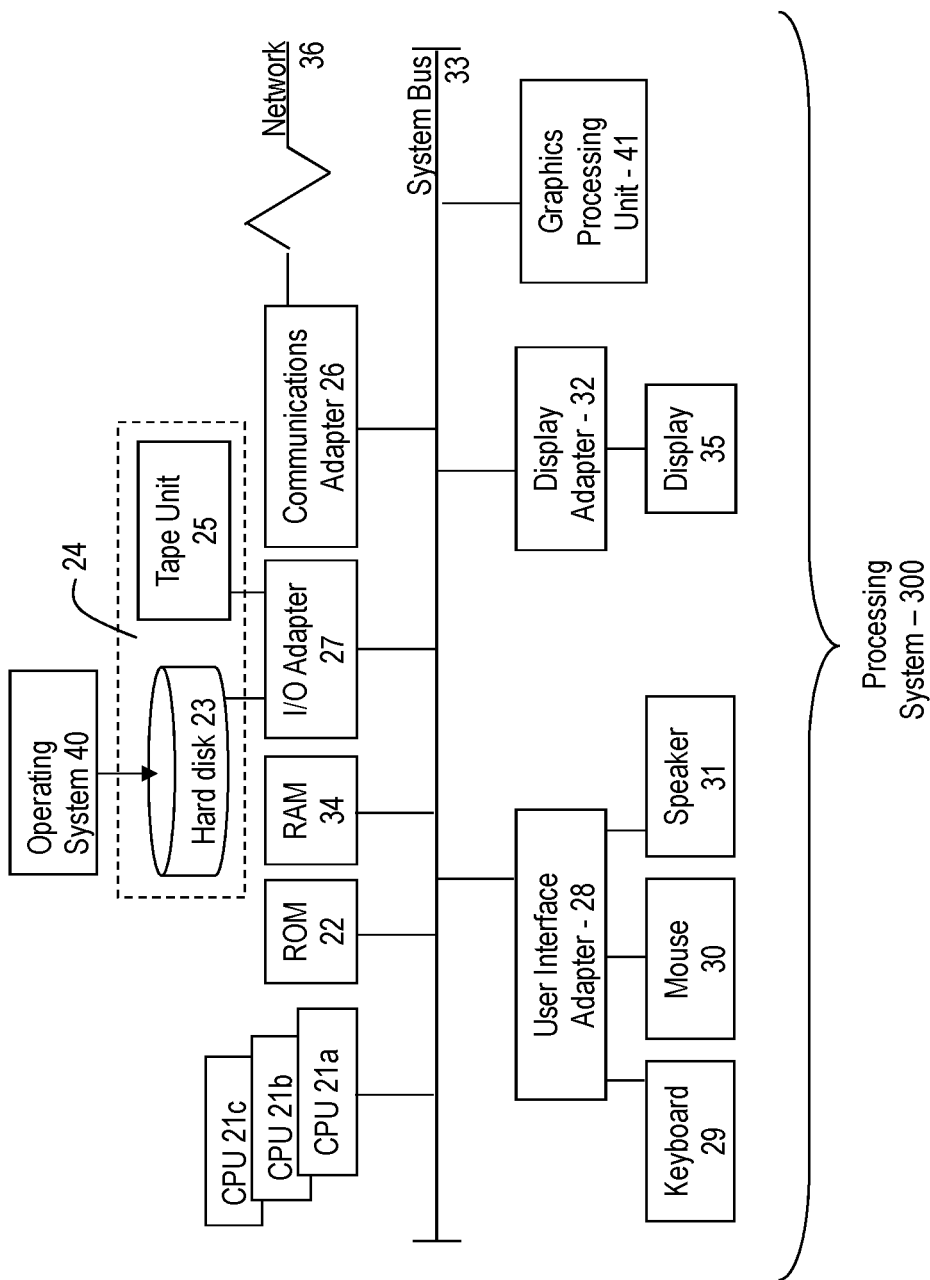
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, modern integrated circuits can include a very large number of circuit components, including circuit elements (e.g., latches and gates) and circuit connections (e.g., electrical connections between pins of latches and/or gates). If there are systemic failures within an integrated circuit design, it can be very difficult and time-consuming to identify the source of the failures due to the large and complex nature of modern circuit design. A common challenge in logic commonality systems designed to detect systematic failures is determining equivalence between unrelated circuit cones with logically equivalent structure. Current techniques, such as core stacking and name masking, rely on patterns in observation latch names, as opposed to properties of the observed circuitry. Core stacking leverages a priori knowledge of identical circuit instances to equate observation latch names, often by removal or wildcarding instance prefixes (i.e., replacing the instance prefix with a wildcard). Name masking is similar to core stacking, but includes additional wildcard fields in latch names. However, there is no guarantee that wildcarded names will identify structurally equivalent logic cones and generally speaking, introducing more wildcards will likely result in less reliable matches. Thus, there is a need for a reliable means of knowing that two functional circuit cones are structurally equivalent independent of observation latch name. Further, because current generation processors can have roughly 20 million observation latches, there is a need for a solution that scales efficiently.

Given two unrelated observation latches with no clear hierarchical name relation, it is possible to trace each functional logic cone and compare their structures to determine equivalence by, for example, determining that the logic cones use the same logic gates in the same configuration. The process of tracing and comparing logic cones is generally automatable and performant on a small scale, but is not effective on a large scale or in "real-time" applications. Alternatively, it is possible to pre-trace all possible observation latch cones, but comparing them all directly does not scale, resulting in the process having a time complexity of $O(N^2)$, which makes large and/or real-time applications infeasible.

Turning now to an overview of the aspects of the invention, one or more embodiments of the invention address the above-described shortcomings of the prior art by providing techniques to reduce traced circuit paths to hashed signatures, which can allow constant time comparison (e.g., having a time complexity of $O(1)$) of different circuits. Thus, the techniques described herein can allow for the comparison of a very large number of circuit cones in a relatively short amount of time in a manner that allows for the identification of structural equivalence. The disclosed techniques facilitate a variety of useful applications, such as for example, identifying failing latches of interest based on matching hash values, aggregating hash signatures to identify common failing circuits, performing failure commonality analysis or similarity comparisons (e.g., which can be used in identifying intellectual property infringement) and identifying commonly occurring sub-circuit structures that may benefit from optimization to increase the overall space, power and/or timing of the design.

Figure 4A:
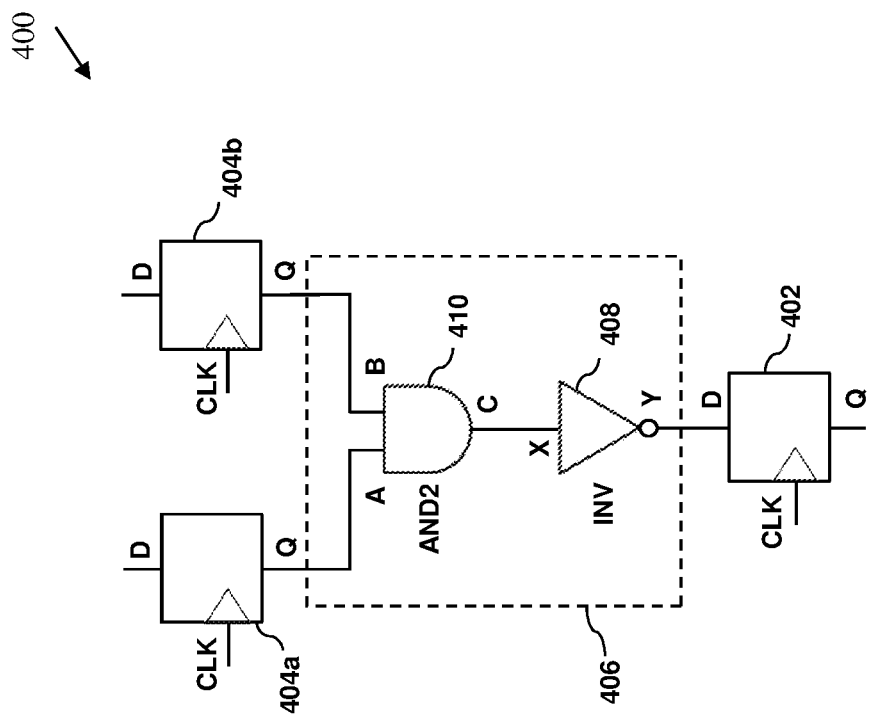
FIG. 4A depicts an example circuit diagram and associated tracing of the logic cone of the circuit diagram according to one or more embodiments of the present invention.

Turning now to a more detailed description of aspects of the present invention, FIG. 4A depicts an example circuit diagram 400 and associated tracing of the logic cone of the circuit diagram according to embodiments of the invention. The circuit diagram 400 includes a circuit cone 406 disposed between an observation latch 402 and two source latches 404a, 404b. According to some embodiments, an observation latch can be considered to be a latch that would detect or observe a failure in the circuit if such failure occurred in an upstream logic cone. Thus, any latch that is downstream from other logic elements of the circuit may be viewed as an observation latch for the purposes of tracing the circuit. As shown in FIG. 4A, a circuit cone 406 can be a group of circuit components that are logically positioned between an observation latch 402 and one or more source latches 404a, 404b. In the example shown in FIG. 4A, the circuit cone 406 includes an inverter 408 and an AND2 gate 410. As shown, each of the latches 402, 404a, 404b can have an input pin D and an output pin Q. Likewise, the inverter 408 has an input pin X and an output pin Y, and the AND2 gate has an output pin C and two input pins A and B.

A circuit such as the one shown in FIG. 4A can be traced to determine and record the various circuit elements and circuit connections present in the circuit design. These identified circuit elements and circuit connections can be recorded in an American Standard Code for Information Interchange (ASCII) format. According to some embodiments, a convention for naming the circuit elements may take the format "cellname:<id>", where the "cellname" is the type of cell or circuit element and the "id" denotes the instance of the cell. For example, the observation latch 402 may be denoted as "LATCH:0" whereas as the first and second source latches 404a, 404b may be denoted as "LATCH:1" and "LATCH:2", respectively. Thus, the elements of the logic cone 406 shown in FIG. 4A can be denoted as "INV:0" and "AND2:0", representing the inverter 408 and AND2 gate 410, respectively. Further, when tracing the edges (i.e., connections) between two circuit elements, the notation may append a ".<pin>" to denote the pin used for connections. For example, the edge between the observation latch 402 and the inverter 408 can be denoted as "LATCH:0.D<=INV:0.Y" which indicates that the Y pin of the inverter 408 is connected to the D pin of the observation latch 402. All of the edges between the various circuit elements can be notated in this manner. Thus, as shown in FIG. 4A, given an observation latch, circuit tracing can find all primitive logic elements connected to the functional input (i.e., pin D of observation latch 402) back to the source latches 404a, 404b and can extract a connectivity graph, which may also include element attributes. According to some embodiments, instance and net names can be ignored for commonality purposes. In some embodiments, primitive cell names may include only logical function and not physical attributes, or may include some limited physical attributes as described below.

Figure 4B:
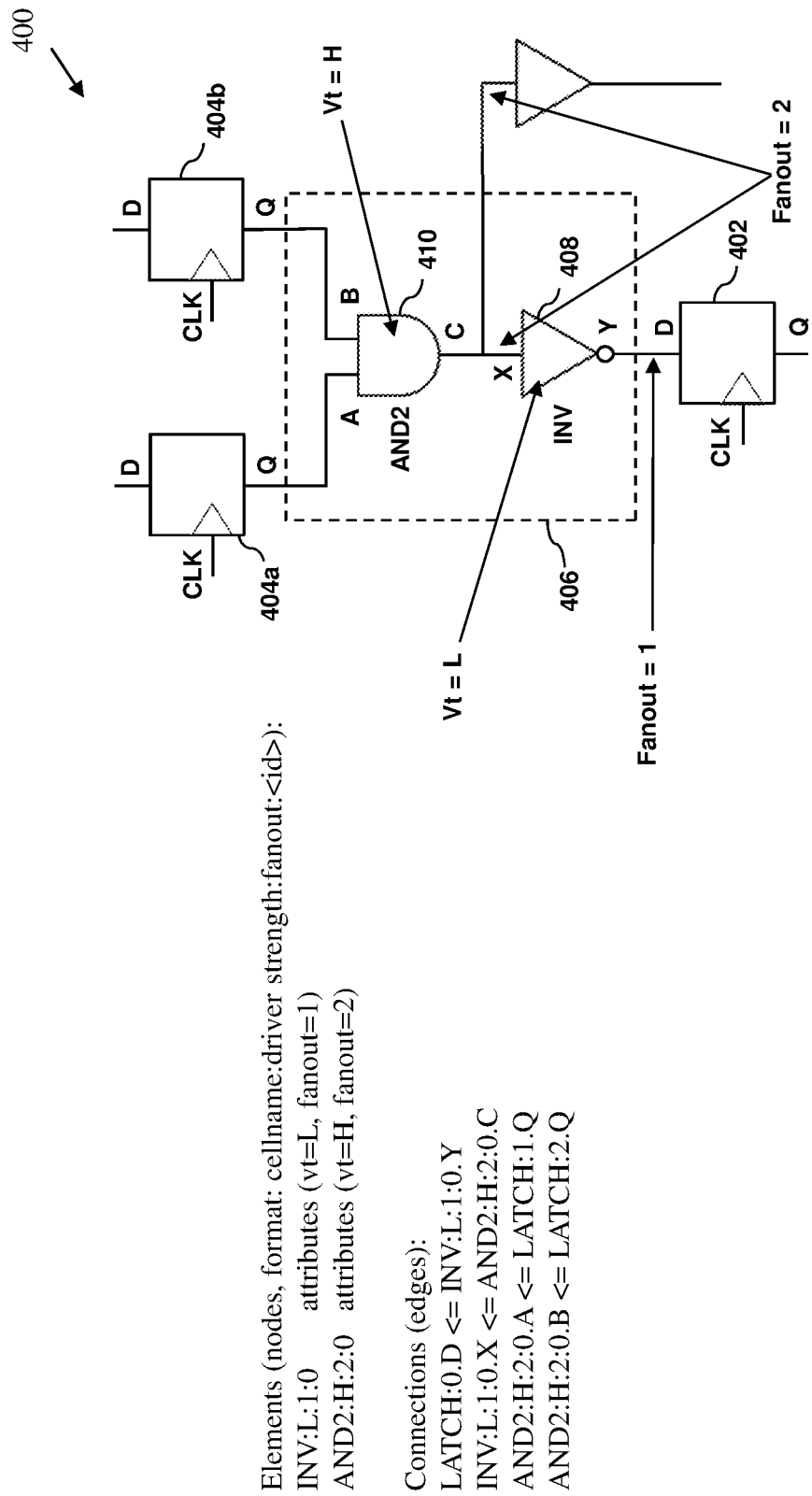
FIG. 4B depicts an example circuit diagram and associated tracing of the logic cone and additional electrical parameters of the circuit diagram according to one or more embodiments of the present invention.

According to some embodiments, as shown by FIG. 4B, circuit tracing notations may also optionally include additional electrical parameters of various circuit elements, such as for example, device driver strength Vt (e.g., low or high) and fanout (i.e., number of circuits the output goes to). As shown in the example in FIG. 4B, the AND2 gate 410 has a Vt=H and a fanout=2, whereas the inverter 408 has a Vt=L and a fanout=1. According to some embodiments, this information can be represented using a format of "cellname: driver strength:fanout<id>" such that AND2 gate 410 can be represented as "AND2:H:2:0" and inverter 408 can be represented as "INV:L:1:0". When determining the edges, the pin names may be appended to the ends of the circuit element notations, such that for example, the edge between observation latch 402 and inverter 408 can be represented as "LATCH:0.D<=INV:L:1:0.Y". It will be understood that these are merely examples and other formats or notation styles may be used in alternative embodiments. Further, in various embodiments, different parameters or other features of the circuit components may be included or excluded from being recorded during a trace. Alternatively, various traces having different levels of granularity (i.e., recording different numbers of parameters) may be performed on the same circuit or circuit cone, which can be used as controls to the tracing algorithm and/or additional similarity metrics. For example, two circuit designs may have the same component layouts but include different electrical parameters (e.g., Vt of an element is "H" in one and "L" in the other) and it may be the case that a systemic failure is being caused in cases where the parameter is one way (e.g., Vt=H) and not the other way (e.g., Vt=L), such that a comparison of thousands of circuits that include these two designs may reveal a clear pattern when the given electrical parameter is included as part of the trace notation, but the pattern is less discernible when it is left out. Thus, performing traces with different levels of granularity can allow for a more robust comparison of large numbers of circuits. According to some embodiments, the level of granularity of a trace (i.e., which and how many electrical parameters to include in a trace) may be selected by a user. As will be described below, each trace will ultimately result in an integer hash value that represents the information associated with the trace, and thus if multiple traces of different granularities are performed on the same circuit cone, the circuit cone may be represented by multiple integer hash values each corresponding to a respective level of granularity/set of traced parameters. As each of the multiple integer hash values represents different physical and electrical data, different sets of hash values can be analyzed against different test data to perform a desired analysis. For example, it may be known that the results of a first type of test do not depend on Vt strength, but the results of a second type of test do, in which case the appropriate set of hash values can be used for analysis of each dataset, which can allow for a more effective analysis.

According to some embodiments, once a circuit trace has been performed and the circuit components are represented in an ASCII format, a hashing algorithm (e.g., SHA-256) may be applied to the ASCII representation of the circuit trace to generate an integer hash value, which represents the circuit trace. As will be understood by those of skill in the art, a hash is an integer identifier that is generated by applying a formula (i.e., a hashing function) to a piece of data, such as a string. Although many different hashing algorithms may be used, a user or the system may select a particular hashing algorithm for use based on the overall size of the circuit design to attempt to avoid hash collisions (i.e., duplicate hash values generated from non-identical inputs). Hashes are useful in that they are deterministic and a hash value can retain the order of multiple steps if the multiple steps are hashed together in order (i.e., if the steps were re-ordered and then hashed then a different hash value would result). There are some drawbacks to hashes, such as there is generally no way to reverse a hash to its original input and most hashing functions strive to minimize duplication (i.e., hash collisions), but cannot guarantee uniqueness. According to some embodiments, hashes may be stored in a hash table that associates each hash value (e.g., "5e38bca4702a6796d800785349ddfbac0984b4bc00c6b15b 3f38cf16aec2683af") with a circuit connection (e.g., such as "AND2:1.A=>INV:0.Y"). In other words, in some embodiments, each traced circuit connection may be hashed and stored in the hash table.

According to some embodiments, a hash table may store hashes for different portions of a circuit, such as different circuit cones and circuit sub-cones. According to some embodiments, the hash table may store hashes representative of the entire circuit or larger portions of a circuit by combining the hash values of the sub-parts of the circuit. For example, a circuit cone that has three sub-cones that each have respective hash values may be represented by combining the three hash values associated with the sub-cones, by, for example, XOR'ing the hash values together to form a single final hash. According to various embodiments, hash tables may include hashes of individual circuit connections, circuit logic cones, circuit sub-cones, a portion of the circuit, the entirety of the circuit and/or any of these additionally incorporating one or more electrical parameters (e.g., Vt, fanout, etc.). According to some embodiments, the hash table may include associated metadata and/or be split up into different subsets of hash tables to indicate the nature of the information represented by the hashes being stored. As will be appreciated by those of skill in the art, there can be many different ways to organize or configure a hash table to store desired data.

There are numerous ways in which hashing could be applied to circuit traces, but for the purposes of structural comparison, close attention should be paid to the ordering of a trace. To trace deterministically, the trace can be done either breadth-first or depth-first and can be, for example, ordered alphanumerically by pin name. For example, the circuit diagram 400 of FIG. 4A could be alternatively traced in order of (relative to the pins of AND2 gate 410) "A then B" or "B then A". In the case of "A then B", a hash value may be determined by, for example, applying a hashing function as hash("INV.X=>AND2.C; AND2.A=>LATCH.Q; AND2.B=>LATCH.Q")= 2016079898055969034. Similarly, but different, in the case of "B then A", a hash value may be determined as, for example, hash("INV.X=>AND2.C; AND2.B=>LATCH.Q; AND2.A=>LATCH.Q")=−314529960793155806. As will be understood by those of skill in the art, although the circuit is exactly the same in each trace, because the ASCII representation of the circuit differed based on the order of the trace, the resultant integer hash values are likely to be vastly different. Thus, for the purpose of determining logic commonality, it can be important to utilize a consistent and deterministic approach to tracing a circuit, such that consistent ordering of traced circuit components is achieved. According to some embodiments of the invention, circuit tracing is performed depth-first in alphabetical order of pin names, although it will be understood that any other deterministic trace algorithm may be used.

Figure 5A:
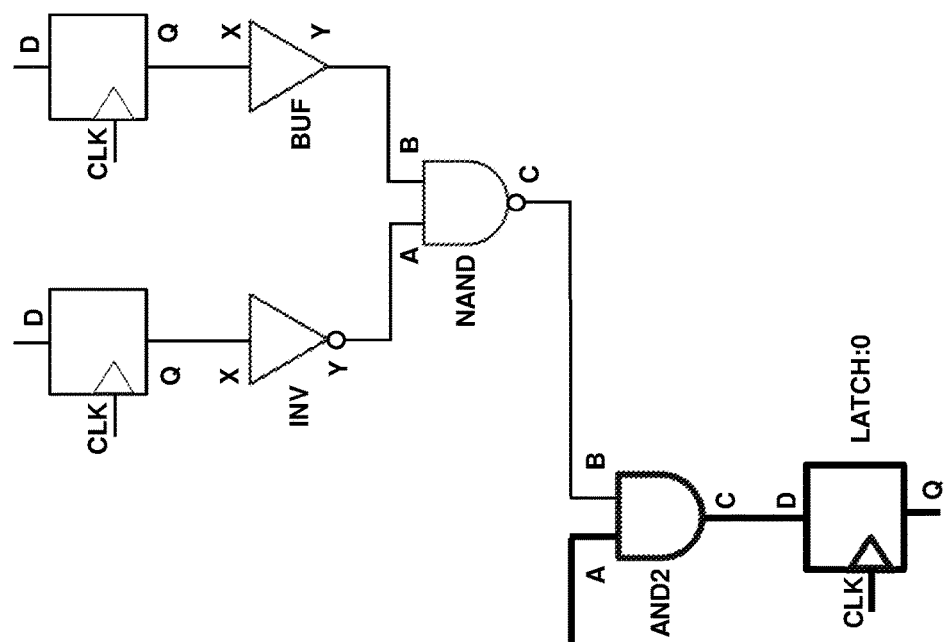
FIG. 5A depicts tracing of a first portion of example circuit diagram according to one or more embodiments of the present invention.
Figure 5A:
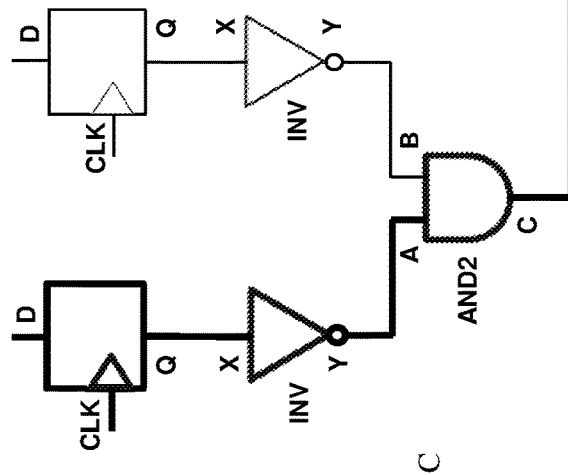
Figure 5B:
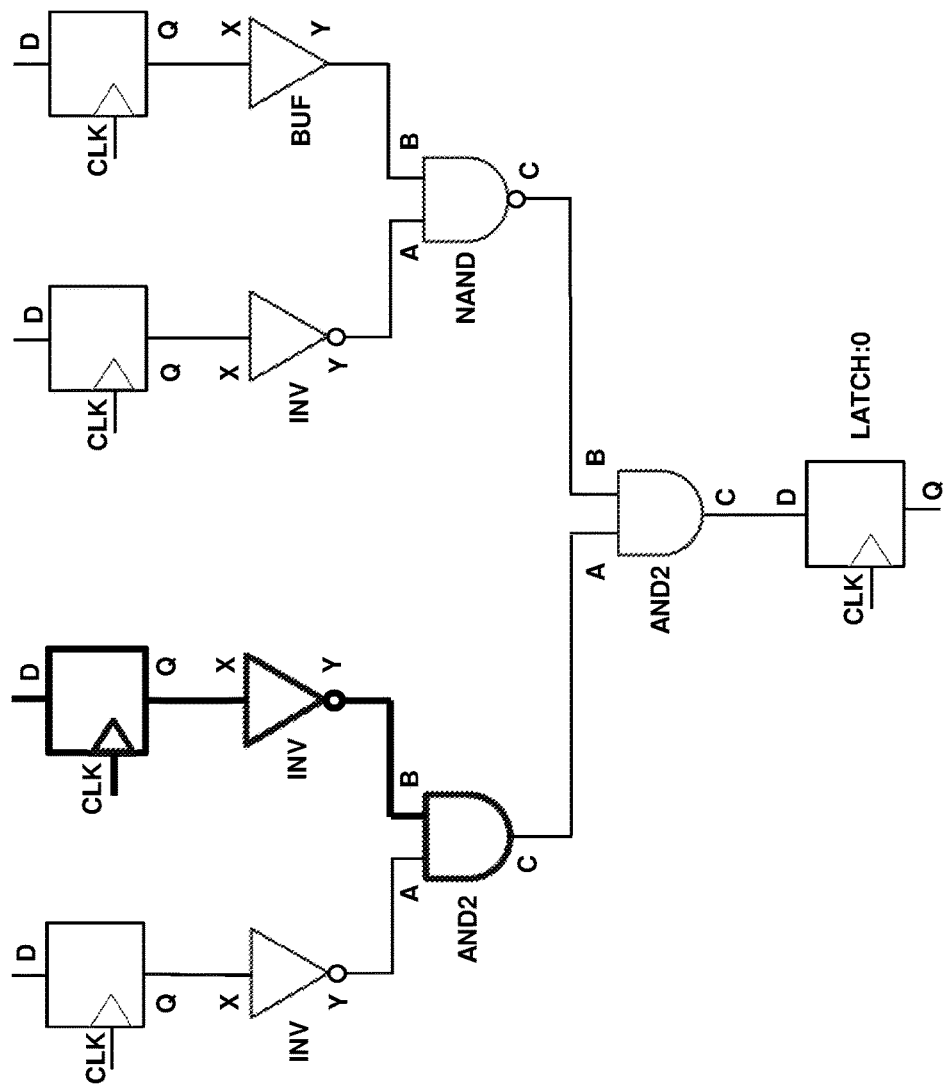
FIG. 5B depicts tracing of a second portion of example circuit diagram according to one or more embodiments of the present invention.
Figure 5C:
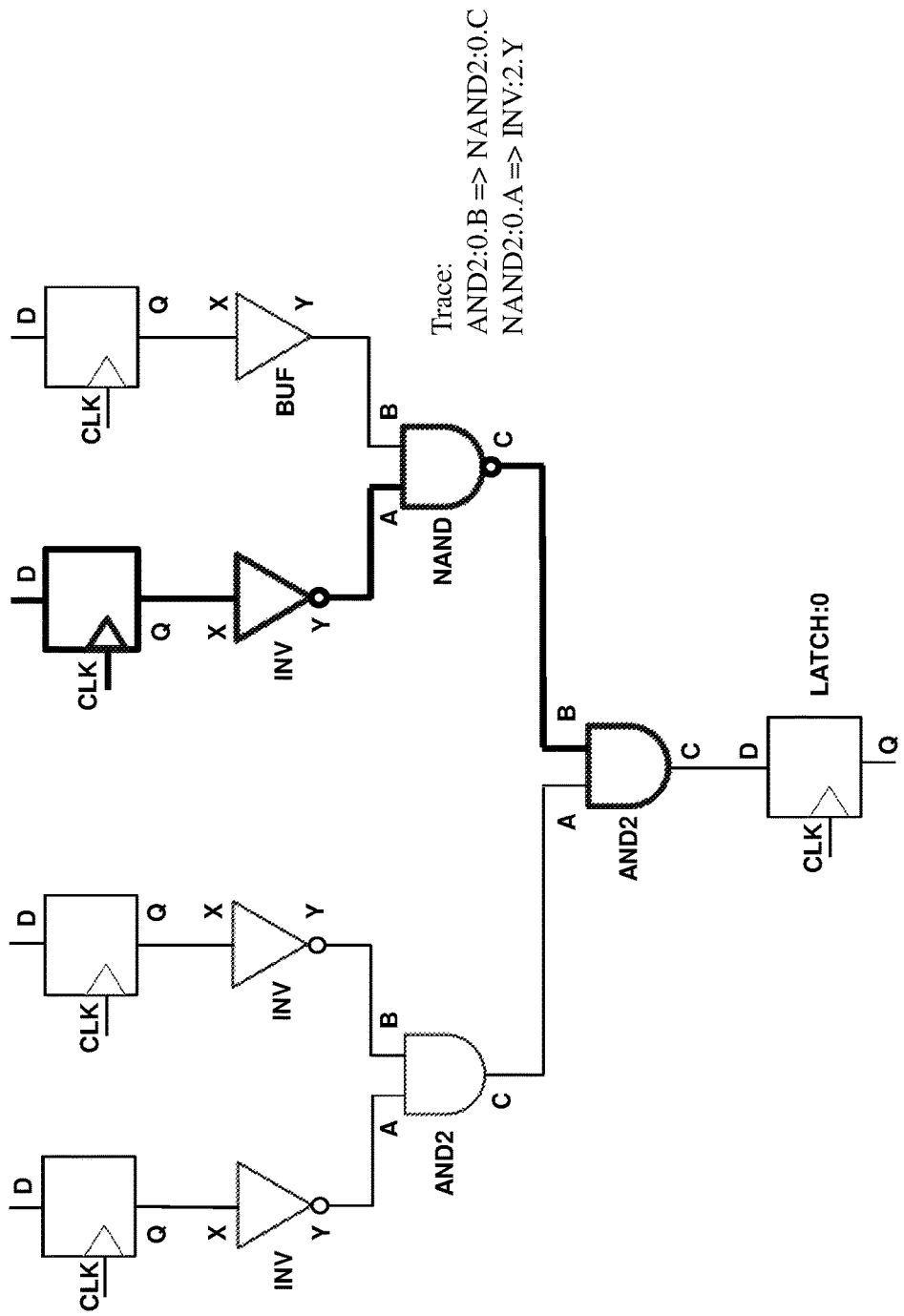
FIG. 5C depicts tracing of a third portion of example circuit diagram according to one or more embodiments of the present invention.
Figure 5D:
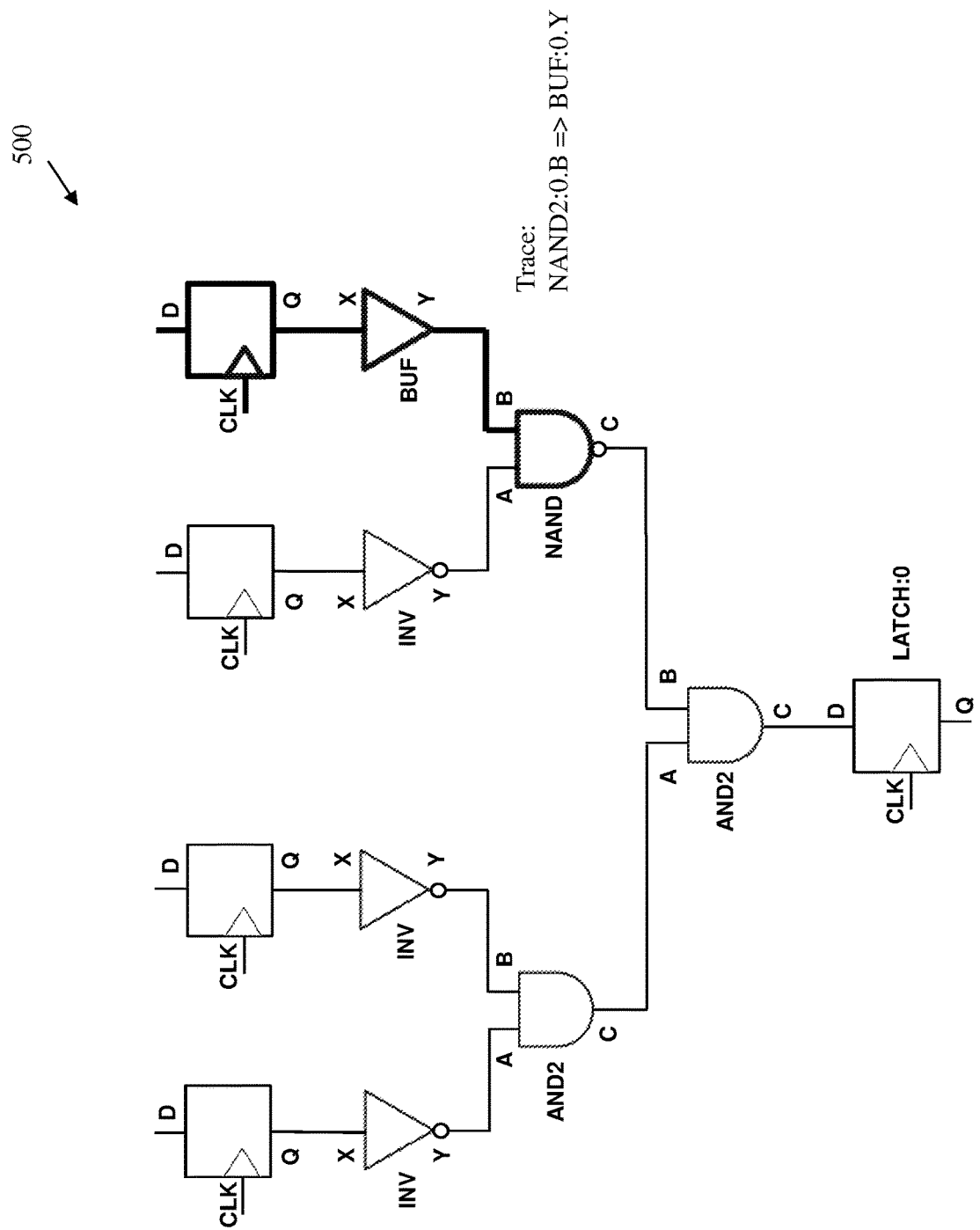
FIG. 5D depicts tracing of a fourth portion of example circuit diagram according to one or more embodiments of the present invention.

An example of tracing a circuit depth-first in alphabetical order of pin names is shown in relation to the circuit 500 depicted in FIGS. 5A-D. According to some embodiments, circuit tracing can be performed by a computer program executed by a processor (e.g., via processing system 300 or using elements of cloud computing environment 50) that searches a circuit design file (e.g., a VHSIC Hardware Description Language (VHDL) file, a Verilog file, a custom design model stored on a disk or the like) to locate observation latches and perform the tracing algorithm on each observation latch. As shown in FIG. 5A, the trace begins at the observation latch (LATCH:0) and traces back on its functional input (pin D) to find the initial AND gate ("AND2:0") and traces back on pin A first, yielding "AND2:0.A=>AND2:1.C". Next, the trace proceeds to the second AND gate ("AND2:1") and traces back first on pin A, yielding "AND2:1.A=>INV:0.Y". Next, at the first inverter ("INV:0"), the system traces back to the first latch and upon encountering this source latch, stops tracing this branch of the circuit 500. As shown in FIG. 5B, the trace then proceeds to the second branch, beginning at the second AND ("AND2:1") and now tracing back on pin B, yielding "AND2:1.B=>INV:1.Y". The trace back from the second inverter ("INV:1") encounters the second source latch, causing the trace of this branch to terminate. As shown in FIG. 5C, the trace proceeds to the third branch of the circuit 500, starting at the initial AND gate ("AND2:0") and now tracing back on pin B, yielding "AND2:0.B=>NAND2:0.C". At the first NAND gate ("NAND2:0"), the system traces back on pin A first, yielding "NAND2:0.A=>INV:2.Y". Tracing back from the third inverter ("INV:2"), the trace of the third branch ceases upon encountering the third source latch. As shown in FIG. 5D, the trace proceeds to the fourth branch of the circuit 500, starting at the first NAND ("NAND2:0") and now tracing back on pin B, yielding "NAND2:0.B=>BUF:0.Y". Upon tracing back from the first buffer ("BUF:0"), the trace terminates upon encountering the fourth source latch. It will be understood by those of skill in the art, that although not depicted by FIGS. 5A-5D, in some cases paths may never hit a source latch but may instead terminate at an external chip pin or be connected to a power supply (e.g., Vdd) or ground to have a constant "1" or "0" input to the pin, which can be noted by the trace. According to some embodiments, the observation latch and/or source latches may be included in the final trace result. In some embodiments, the observation latch and/or source latches may not be included in the final trace result, depending on whether the user is interested in what type of latches launched a value.

Figure 6:
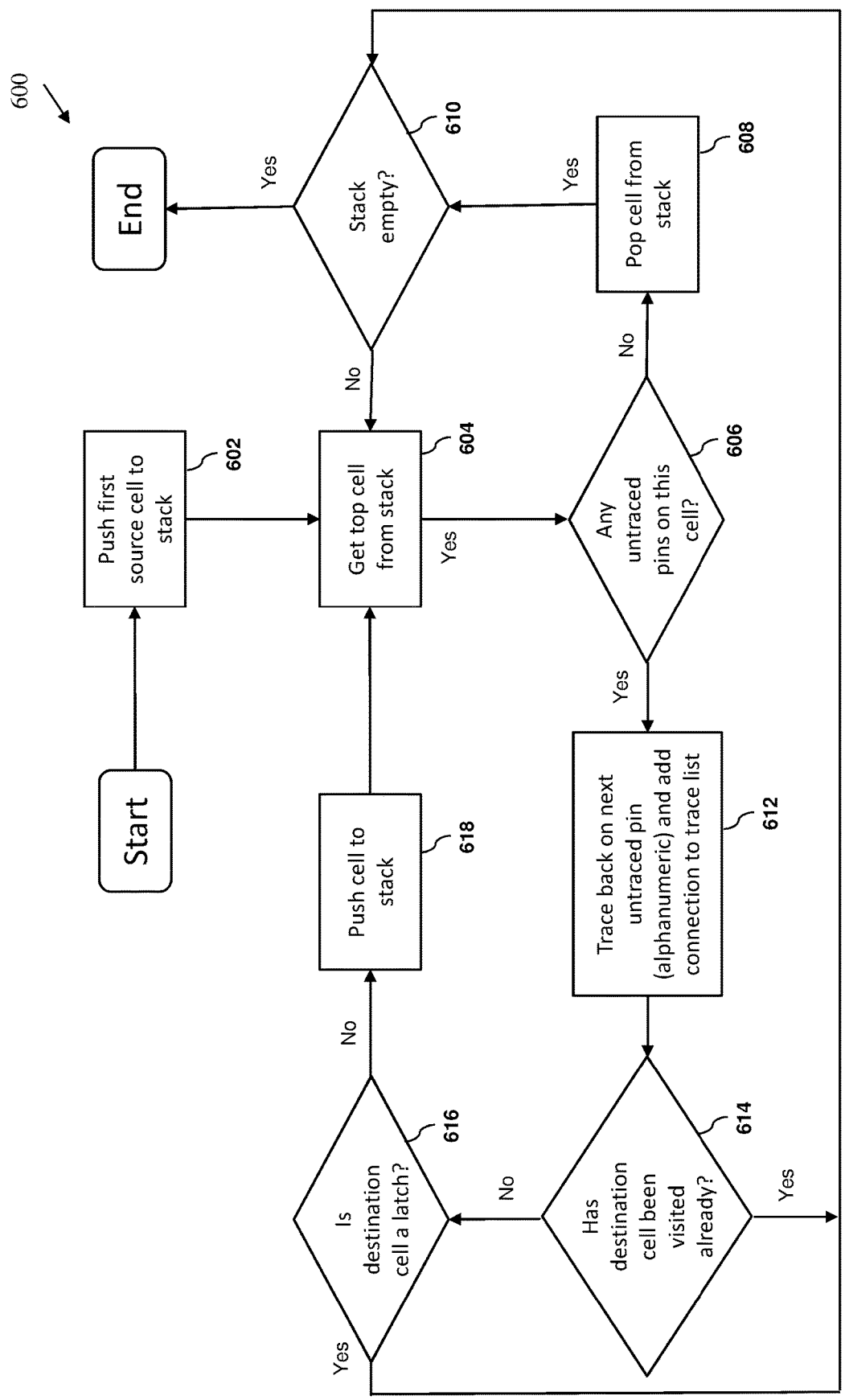
FIG. 6 depicts a flow diagram of a method of tracing a circuit cone according to one or more embodiments of the present invention.

FIG. 6 depicts a flow diagram of a method 600 for tracing a circuit cone according to one or more embodiments. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method begins at block 602, where the first source cell is pushed on to the stack of cells to be traced. According to some embodiments, the first source cell may be the cell that is electrically connected to the input of the observation latch. As will be understood by those of skill in the art, a "cell" may refer to a circuit element, such as an inverter, an AND gate, a NAND gate, or any other such type of logic. At block 604, the method 600 includes retrieving the top cell of the stack, which at least initially will be the first source cell. At block 606, the method includes determining whether there are any untraced pins on the selected cell. If the system (e.g., a processor) determines that there are no untraced pins on the cell, then the method proceeds to block 608, where the method includes discarding the cell from the stack and then determining, at block 610 whether the stack is empty. If the stack is empty, the method 600 ends. However, if the stack is not empty, the method proceeds back to block 604 to retrieve the next cell at the top of the stack. If at block 606, the system determines that there are untraced pins on the current cell, then the method proceeds to block 612, where the method includes tracing back on the next untraced pin in alphanumeric order and adding the connection to the trace list, for example as shown in FIG. 5A. The method then proceeds to block 614, in which the method includes determining whether the destination cell has been visited already. If the system determines that the destination cell has been visited via the trace already, then the method proceeds to block 610 where the system determines whether the stack is empty. However, if the system determines that the destination cell has not yet been visited, then the method proceeds to block 616, where the method includes determining whether the destination cell is a latch or not. If the system determines that the destination cell is a latch, then the method proceeds to block 610, but if the system determines that the destination cell is not a latch, then the method proceeds to block 618, where the method includes pushing the destination cell to the stack for future continued analysis. After the destination cell is pushed to the stack at block 618, the method proceeds back to block 604 where the top cell of the stack is again retrieved for analysis. It will be understood that this method is exemplary, and other deterministic tracing methods or approaches may alternatively be employed according to various embodiments of the invention.

Figure 7:
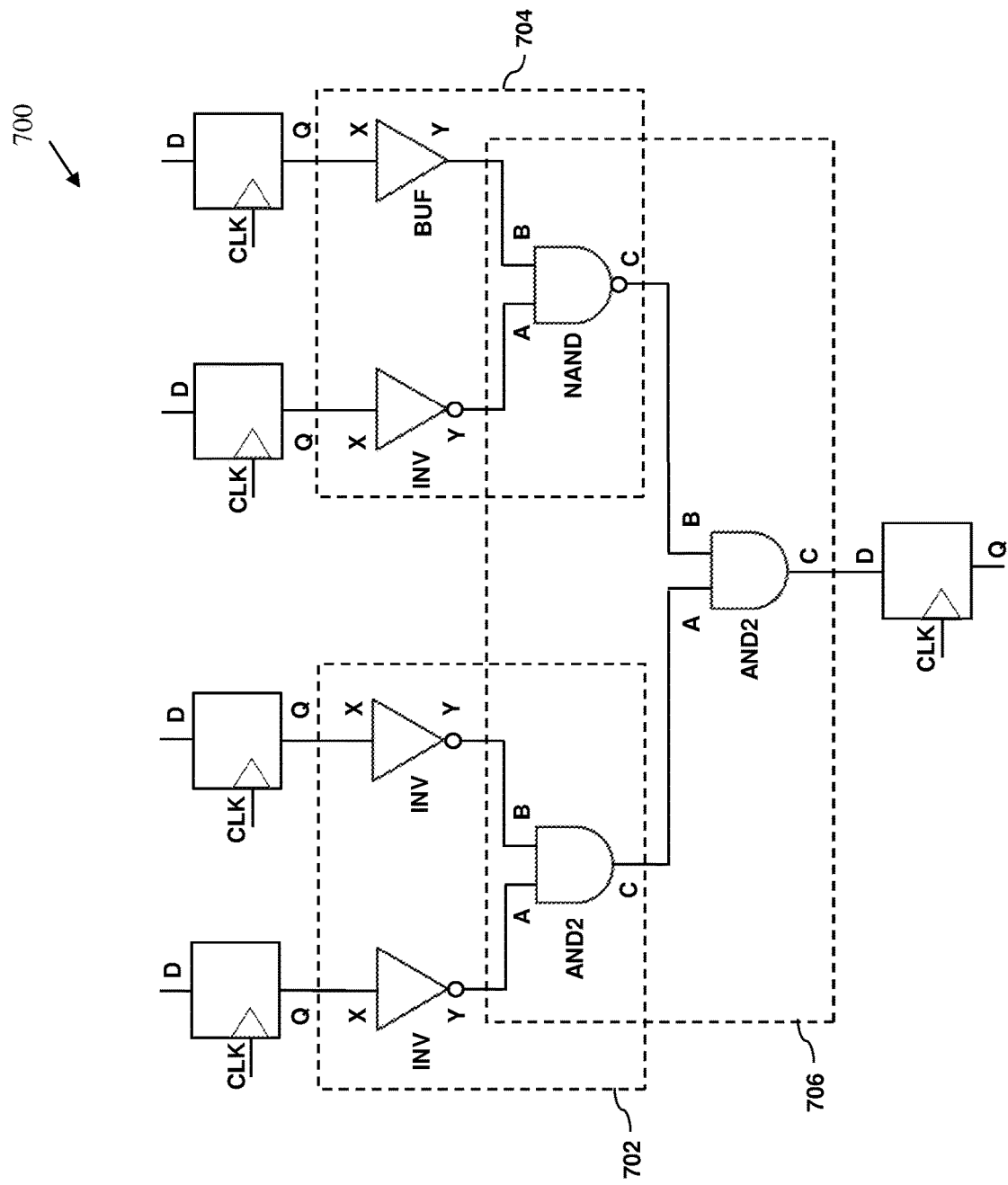
FIG. 7 depicts an example circuit diagram and associated tracing of the various logic cones of the circuit diagram according to one or more embodiments of the present invention.
Figure 8:
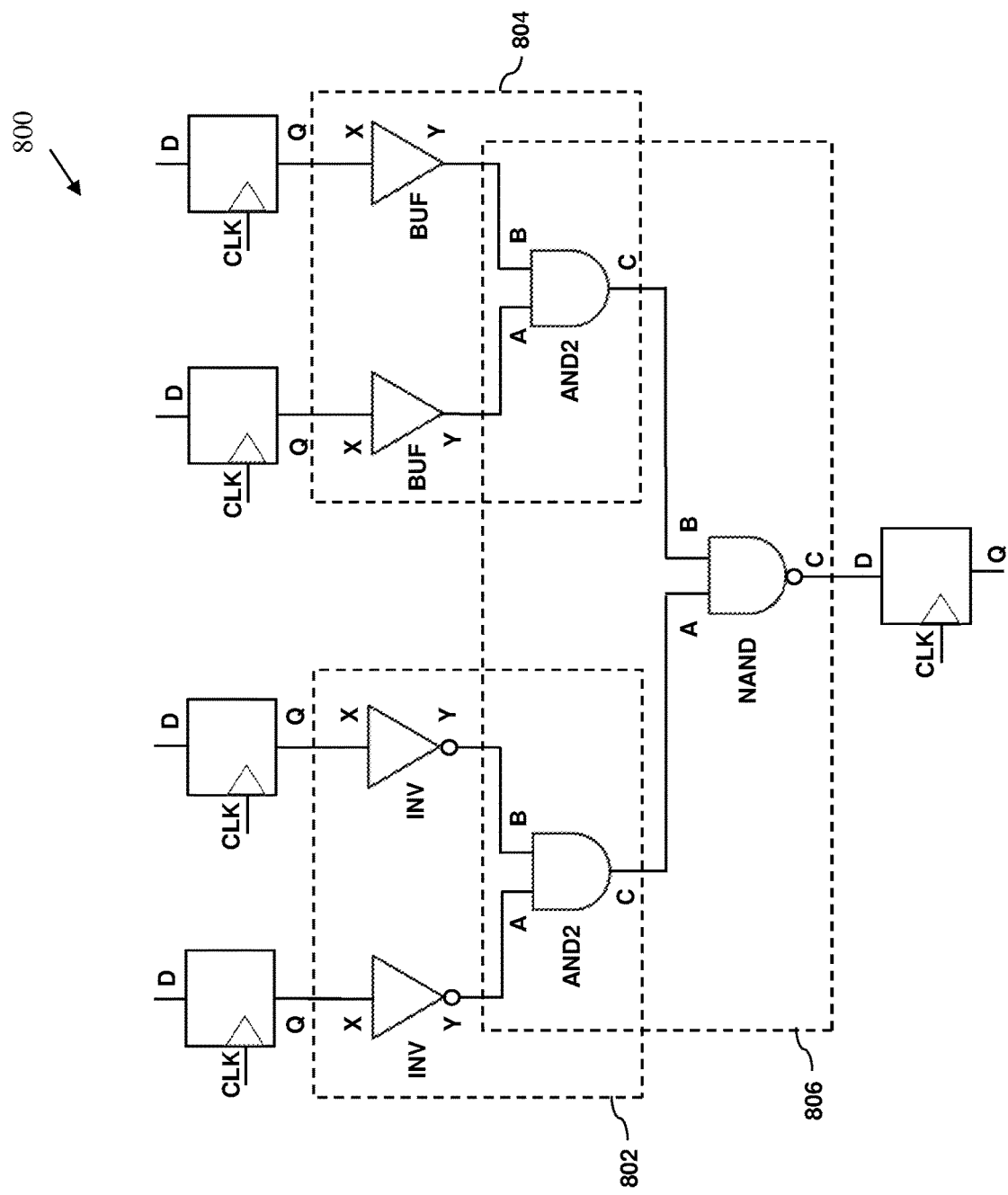
FIG. 8 depicts another example circuit diagram and associated tracing of the various logic cones of the circuit diagram according to one or more embodiments of the present invention.

While the techniques described herein can be used to identify functionally equivalent cones of logic, there may also be instances where the cones of logic are not totally equal, but it may nonetheless be useful to identify identical sub-cones. FIG. 7 depicts an example circuit diagram 700 having a first sub-cone 702 that includes an AND2 gate, and two inverters, a second sub-cone 704 that includes a NAND gate, an inverter and a buffer, and a third sub-cone 706 that includes two AND2 gates and a NAND gate. The results of a trace that was performed depth-first in alphabetical order of pin name beginning with the AND2 gate positioned above the observation latch is also displayed in FIG. 7. FIG. 8 depicts a similar example circuit diagram 800 having a first sub-cone 802, a second sub-cone 804 and a third sub-cone 806, along with the results of a trace that was also performed depth-first in alphabetical order by pin name. While the circuit diagram 800 of FIG. 8 appears similar to that of circuit 700 in FIG. 7, elements of the second sub-cone 804 and third sub-cone 806 are slightly different than the corresponding sub-cones of FIG. 7. However, the first sub-cone 802 of the circuit diagram 800 of FIG. 8 is identical to the first sub-cone 702 of the circuit diagram 700 of FIG. 7. Because the overall traces of the overall circuit cones of circuits 700 and 800 are different, the hash values generated by hashing the ASCII representations of the traces will also be different. However, if each sub-cone trace is individually hashed, the hash value corresponding to the trace of the first sub-cone 702 of FIG. 7 (i.e., hash("AND2.A=>INV.Y; AND2.B=>INV.Y")) will match the hash value corresponding to the trace of the first sub-cone 802 of FIG. 8 (i.e., hash("AND2.A=>INV.Y; AND2.B=>INV.Y")), whereas the hash values corresponding to each of the other four sub-cones 704, 706, 804, 806 will all be different from one another. Although FIGS. 7 and 8 depict circuit traces that include the instance number of each circuit element for ease of viewing the trace, according to some embodiments, the instance numbers of the elements may not be included in the ASCII representation that is used to generate the hash values so that functionally equivalent circuit portions will generate equivalent hash values without regard to what the instance number of each circuit element is. Thus, as shown by FIGS. 7 and 8, although two circuits may not be identical, it may nonetheless be possible to apply the techniques discussed herein to identify identical portions (i.e., sub-cones) of the circuits by determining that the hash values associated with those portions of the circuit that match one another. This is useful because if it is determined that a particular sub-cone is causing a systemic logic failure, then all other functionally equivalent sub-cones can be easily identified by their matching hash values, making it possible to, for example, quickly revise a circuit design file to replace all instances of the sub-cone with an alternative that does not give rise to the failure.

As previously mentioned above, hashes are one-way functions, and thus during analysis of hashed sub-circuits (i.e., sub-cones), it is likely that a user will need to map a hash back to the source circuit to identify exactly which circuit components are represented by the hash value. For example, assuming the three sub-cones 702, 704 and 706 of FIG. 7 have been previously individually hashed resulting in hash values X, Y and Z (which each represent a large unique string of numbers), which are then stored in a hash table along with a large number of other hash values that represent other circuit portions. At a later time, if Y becomes a hash of interest (e.g., due to a designer noting some anomalous occurrence associated with the hash value), the hash will need to be mapped back to the source circuit to determine what circuit components are represented by the hash value so that further analysis may be performed. This can be achieved in at least two straight forward approaches. The first approach involves recording and storing the source sub-circuit along with the hash. Thus, in some embodiments, the system may store information indicative of the sub-circuit elements and connections in a table in association with the hash value and then the sub-circuit may be identified by performing a table lookup based on the hash value of interest. The second approach is to re-trace the logic cone that contains the sub-circuit and re-hash the sub-cones to determine the hash value that matches a hash value of interest. For example, to determine what circuit components are represented by the Y hash, the system may simply re-trace the circuit 700 shown in FIG. 7, re-hash each sub-cone 702, 704, 706 in a manner identical to the original hashing of the sub-cones, determine which newly generated hash value matches the Y hash value and then identify the circuit components associated with the matching newly generated hash value. Although it requires selective re-hashing of a circuit cone, this latter method is much less storage intensive than the first method.

Sub-cone analysis can also be used to determine degrees of similarity between two non-identical circuit structures, using, for example, Jaccard Indices. As will be appreciated by those of skill in the art, a Jaccard Index can be used to measure the similarity between two sets A and B by determining the size of the intersection of the two sets divided by the size of the union of the two sets. A Jaccard Index can range from 0 to 1, with "0" representing completely dissimilar sets and "1" representing identical sets. An example of a Jaccard Index calculation can be given with respect to the circuits shown in FIGS. 7 and 8, where sub-cones 702 and 802 are identical and all of the other sub-cones 704, 706, 804, 806 are unique. When a hash value is generated for each sub-cone, the first set of hash values corresponding to circuit 700 may be {K, L, M} and the second set of hash values corresponding to circuit 800 may {K, N, O}. The two sets have an intersection of {K} and a union of {K, L, M, N, O}, resulting in a Jaccard Index calculation of J=1/5=0.2. Thus, the circuits 700, 800 shown in FIGS. 7 and 8 can be considered to have a similarity measurement of "0.2". According to some embodiments, the system can use a Jaccard Index to help identify logically equivalent blocks. For example, in practice, there may be different ways to physically construct portions of a circuit that are intended to perform the same function (e.g., in one instance two elements share a power connection whereas in another instance they may not). Thus, in some cases, even though the design of a portion of a circuit is not identical to another portion, they may nonetheless be functionally equivalent and can be identified by for example, determining Jaccard indices for a plurality of sets of hash values, where each set, for example, corresponds to a separate logic cone or sub-cone, and identifying comparisons that have a Jaccard index above a predetermined threshold. This may be particularly useful in a use case where it is desired to replace non-optimized circuit blocks with optimized circuit blocks, as the system may be configured to automatically identify all instances of the non-optimized circuit blocks by finding matching hash values or hash value sets with a Jaccard Index above a predetermined threshold, and automatically replacing those block in a circuit diagram (e.g., an electronic design schematic file).

Different methods of sub-circuit decomposition can result in different Jaccard Indices. Two non-identical yet similar circuits can have a Jaccard Index of 1 if hashing only unique sub-circuits. For example, if a first circuit consists of two inverters in series and a second circuit consists of five inverters in series, if the sub-cone analysis only compares two-cell sub-circuits then the Jaccard Index between the first circuit and second circuit will be 1 because every two-cell sub-circuit will have the same hash value (each derived from two inverters connected in series). However, using an aggregating sub-circuiting method, or by including full cone hashes in the analysis, the circuits can be shown to be non-identical. Thus, for example, if in the case of the second circuit, hashes are performed on a two-cell sub-circuit (i.e., the first two inverters in series), a three-cell sub-circuit (i.e., the first three inverters in series), a four-cell sub-circuit (i.e., the first four inverters in series) and a five-cell sub-circuit (i.e., all five inverters in series), then four different hash values (e.g., "A, B, C, D") will be generated in relation to the second circuit as compared to the single hash value (e.g., "A") of the first circuit. Following this approach, the Jaccard Index calculated based on a comparison of the hash values of the first circuit and the second circuit will yield a similarity measurement of 0.25. Thus, according to some embodiments, an aggregating sub-circuiting method (i.e., including progressively more circuit elements in a trace to be hashed) may be utilized by the system to generate hash values for overlapping portions of the circuit. Further, in some embodiments, electrical parameters (e.g., $V_t$, fanout, etc.) can also be used as a control during tracing to allow the similarity algorithm to be tuned. For instance, in the previous example, $V_t$ could be used to distinguish between different 2-inverter stages where there are for example, five inverters in series. In this case, despite appearing to be the same based on the circuit diagram, it can be determine that one or more 2-inverter stages are different based on the electrical parameters.

Common functional blocks, such as adders, multiplexers, And Or Invert blocks (AOI's) and the like, are commonly optimized for space, power and timing without altering the underlying functionality of the blocks. For example, an AOI can be optimized by constructing it from an AND gate feeding into a NOR gate rather than using an AND gate feeding into an OR gate feeding into an Inverter. Such optimization can be achieved by physically altering or omitting individual building-block gates within a block, provided that the output of the circuit remains the same as the original design. Other common techniques for optimization can include removing redundant vias and wires, re-routing internal wires, and reshaping the circuit. An integrated circuit design may be originally designed having a large number (e.g., thousands) of functional blocks that are not optimized, for which it may be desirable to replace such functional blocks with optimized versions of the functional blocks, however, due to the very large number of blocks present in the design and the problems with identifying functional equivalents noted above with respect to current methodologies, it may be very impractical (i.e., very time-consuming) to do so. However, utilizing the techniques described herein, the system can perform circuit traces as described herein, reducing functional blocks to a hash value representation stored in a hash table, so that every instance of a given non-optimized functional block may be quickly identified and replaced with a new optimized block design. For example, if a non-optimized block is represented by a hash value X, the system can search the hash table for every instance of "X" and flag it as a block to be replaced by the new optimized block. According to some embodiments, the system may automatically replace the portions of the circuit diagram corresponding to each hash value of X in the hash table with the optimized functionally equivalent block design. Thus, the techniques described herein can be used to quickly and scalable execute systemic design improvements to a large integrated circuit design in near real time.

Figure 9:
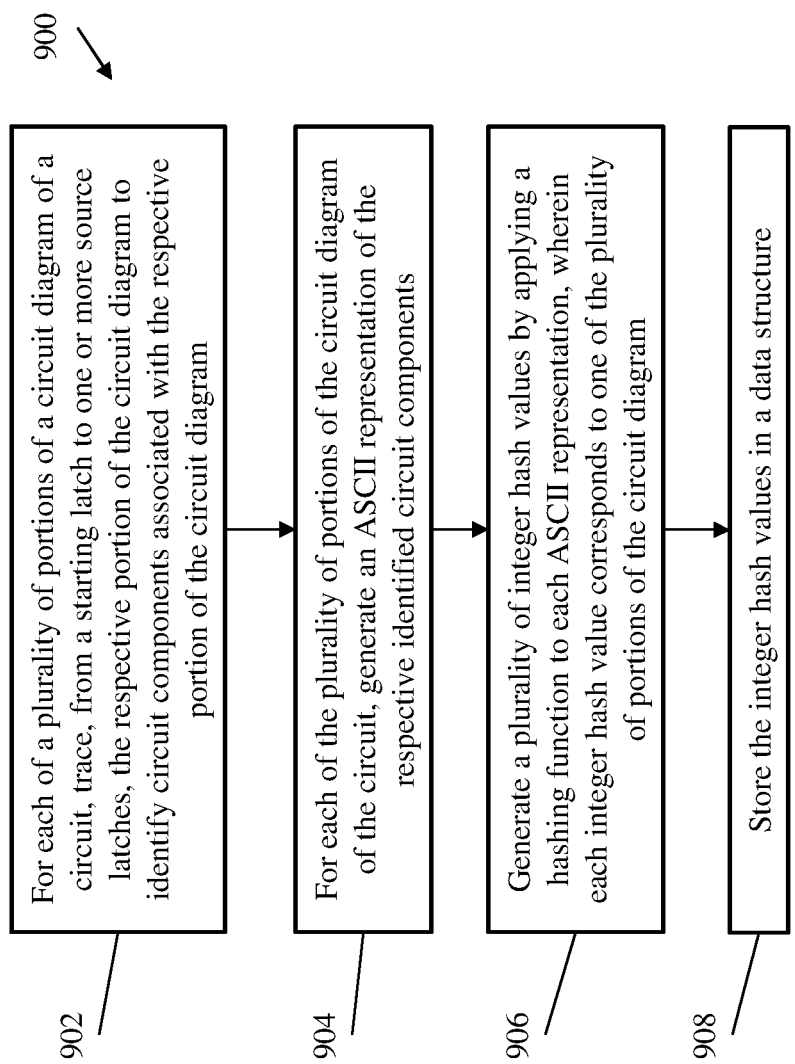
FIG. 9 depicts a flow diagram of a method for generating a functional logic cone signature for circuit analysis according to one or more embodiments of the invention.

Turning now to FIG. 9, a flow diagram of a method 900 for generating a functional logic cone signature for circuit analysis in accordance with an embodiment is shown. In one or more embodiments of the present invention, the method 900 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 900 begins at block 902 and includes tracing (e.g., via a processor), for each of a plurality of portions of a circuit diagram of a circuit, the respective portion of the circuit diagram to identify circuit components associated with the respective portion of the circuit diagram from a starting latch to one of one or more source latches. Although the method generally recites tracing from and to latches, it will be understood by those of skill in the art that it is contemplated that in various embodiments, tracing may begin and end at other non-latch starting and ending points (e.g., external pins).

According to some embodiments, a processor may perform the trace on an electronic file that contains one or more circuit diagrams. The circuit components can include circuit elements and circuit connections. In some embodiments, tracing can be performed depth-first in alphabetical order of pin names, as described above. According to some embodiments, tracing the respective portion of the circuit diagram to identify circuit components associated with the respective portion of the circuit diagram can include identifying a first set of circuit components that comprises only circuit elements and circuit connections and identifying a second set of circuit components that comprises circuit elements, circuit connections and electrical parameters associated with circuit elements. According to some embodiments, the method may further include selecting one of the first set of circuit components or the second set of circuit components to achieve a desired level of granularity of analysis, and wherein the set of hash values that correspond to portions of the circuit diagram that are associated with the plurality of failures in the circuit are derived from the selected one of the first set of circuit components or the second set of circuit components.

As shown at block 904, the method includes generating (e.g., via a processor) an ASCII representation of the respective identified circuit components for each of the plurality of portions of the circuit diagram of the circuit. For example, the ASCII representation may represent each circuit connection and the associated circuit elements of the trace.

As shown at block 906, the method includes generating (e.g., via a processor) a plurality of hash values by applying a hashing function to each ASCII representation. Each hash value can correspond to one of the plurality of portions of the circuit diagram. According to some embodiments, the hash values may be integers. In some embodiments, the hash values may be alphanumeric values.

As shown at block 908, the method includes storing (e.g., via a processor) the hash values in a data structure, such as a table of hash values, a hashed data structure, a database table or the like. According to some embodiments, each hash value may be associated with a respective circuit connection or group of circuit connections represented by the underlying ASCII representation.

According to some embodiments, the method 900 may further include receiving an indication of a plurality of failures in the circuit based on executing a test of the circuit and identifying a common cause of two or more of the plurality of failures in the circuit. In some embodiments, identifying a common cause of two or more of the plurality of failures in the circuit can be achieved by identifying a set of hash values that correspond to portions of the circuit diagram that are associated with the plurality of failures in the circuit and comparing each of the set of hash values to one another to identify commonalities. Test failures are typically reported by observation latch name (i.e., the latch that observes the failure). In some embodiments, all hash values for a given observation latch can be stored in a table and the system can look up all hash values for all failing latch names and calculate frequencies to identify potential common failure causes. In some embodiments, a circuit may have a known failure (e.g., as determined by some other means) that has been reported by the individual circuit name (as opposed to the latch name) and the system can find the circuit name (e.g., either manually using a design browser or automatically using software code designed to do so), find the observation latch(es) by tracing forward from the circuit, lookup or regenerate hashes from the latch, and then find identical or highly similar circuits that may also have the failure using the pre-generated hash table. The techniques described herein are advantageous because according to some embodiments, executing the test of the circuit and identifying a common cause of two or more of the plurality of failures in the circuit may be performed in O(1) time (i.e., performed having a time complexity of O(1)).

In some embodiments, the method 900 may further include mapping a stored hash value back to the circuit diagram. In some embodiments, mapping a stored hash value back to the circuit diagram can include storing data representative of each trace of the plurality of portions of the circuit diagram in association with a corresponding hash value, searching the data structure for the stored hash value and recreating the respective portion of the circuit diagram based on the data representative of the trace associated with the stored hash value.

According to some embodiments, the circuit diagram can be a first circuit diagram of a first circuit having a first plurality of sub-circuits and the hash values are a first set of hash values and the method 900 can further include generating a second set of hash values based on a second circuit diagram of a second circuit having a second plurality of sub-circuits and determining a similarity measurement between the first circuit diagram and the second diagram by calculating a Jaccard Index of the first set of hash values and the second set of hash values. In some embodiments, in response to determining that the Jaccard Index exceeds a predetermined threshold, the method may further include determining that the second circuit substantially matches the first circuit.

According to some embodiments, the method 900 may further include generating an hash value representative of a sub-optimal circuit block, identifying one or more corresponding sub-optimal circuit blocks of the circuit diagram in response to identifying one or more hash values stored in the data structure that match the hash value representative of the sub-optimal circuit block, and modifying the circuit diagram to replace the one or more corresponding sub-optimal circuit blocks with an optimized circuit block.

The techniques described herein can be used for a number of different applications that can provide technical benefits such as systemic failure identification, real time comparative circuit analysis, efficient design improvement and optimization and other such benefits. For example, according to some embodiments, failing circuit commonality may be determined by the system by tracing the circuit connections and elements, generating hash values based on the traced circuit information as described above, storing the hashes in a data structure (e.g., a table of hash values), using the data structure to look up hash signatures for failing latches of interest, and then aggregating the hash signatures to identify common failing circuits. According to some embodiments, the system may utilize a machine learning model to group and classify signatures and relate them to other known attributes of the hardware to automatically flag the source(s) of systemic circuit failures.

Other applications can include the facilitation of the analysis of circuit cones. For example, in some embodiments, a primary hash table storing hashes of latch cones may be used to identify repeated circuit failure hash values and circuit commonality. According to some embodiments, a secondary "sub-cone" table can be created that contains sets of sub-circuit hash values, which can be used for failure commonality analysis or similarity comparisons (e.g., Jaccard Index generation).

As described above, another application of the techniques described herein can involve identifying common sub-circuit structures that could benefit from optimization by, for example, generating a set of integer hash values representing sub-circuitry as described above and aggregating sets of failing sub-circuit hash values to find frequently used structures. In other words, the system may count the number of occurrences of each sub-circuit hash, reverse map the circuit hash to identify the frequent repeated structure (as previously described above), which can then be flagged and provided to design teams who can attempt to create power, timing and space optimized implementations of the circuit(s). According to some embodiments, the system can then automatically replace or update all instances of the frequently occurring sub-circuit with the optimized version, quickly and efficiently realizing large overall savings in power, timing, and space in an integrated circuit.

A further application of the techniques disclosed herein includes a method of automated infringement detection based on received design files. The system can trace and hash two circuit designs as described herein and then can analyze cross-design structure commonality to detect, for example, intellectual property infringement. Further, such intellectual property infringement detection provides the additional benefit that such proprietary circuit designs may be compared based on the hash value representation, such that a comparison may be achieved while preventing individuals from viewing the underlying circuit structures until an indication of a high degree of similarity has been automatically detected. Infringement detection may be particularly useful in a foundry-like environment, in which a user has access to designs or hash databases from multiple clients, and the tracing and hashing are performed for every design. The tracing can be tuned to include electrical and physical parameters. The system can compare the hash values of designs to identify structures that are repeated across separate designs and repeated hashed identities can be reverse-mapped to identify common circuitry in the two designs and flagged for further investigation of intellectual property infringement.

Additional processes may also be included. It should be understood that the processes depicted in FIGS. 6 and 9 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
for each of a plurality of portions of a circuit diagram of a circuit, tracing, from a starting latch to one of one or more source latches, the respective portion of the circuit diagram to identify circuit components associated with the respective portion of the circuit diagram, wherein the circuit components comprise circuit elements and circuit connections;
for each of the plurality of portions of the circuit diagram of the circuit, generating an ASCII representation of the respective identified circuit components;
generating a plurality of hash values by applying a hashing function to each ASCII representation, wherein each hash value corresponds to one of the plurality of portions of the circuit diagram; and
storing the hash values in a data structure.

2. The computer-implemented method of claim 1 further comprising:
  receiving an indication of a plurality of failures in the circuit based on executing a test of the circuit; and
  identifying a common cause of two or more of the plurality of failures in the circuit by:
    identifying a set of hash values that correspond to portions of the circuit diagram that are associated with the plurality of failures in the circuit; and
    comparing each of the set of hash values to one another to identify commonalities.

3. The computer-implemented method of claim 2, wherein executing the test of the circuit and identifying the common cause of two or more of the plurality of failures in the circuit is performed in O(1) time.

4. The computer-implemented method of claim 1, wherein tracing is performed depth-first in alphabetical order of pin names.

5. The computer-implemented method of claim 2, wherein tracing the respective portion of the circuit diagram to identify circuit components associated with the respective portion of the circuit diagram comprises:
  identifying a first set of circuit components that comprises only circuit elements and circuit connections; and
  identifying a second set of circuit components that comprises circuit elements, circuit connections and electrical parameters associated with circuit elements.

6. The computer-implemented method of claim 5, further comprising selecting one of the first set of circuit components or the second set of circuit components to achieve a desired level of granularity of analysis, and wherein the set of hash values that correspond to portions of the circuit diagram that are associated with the plurality of failures in the circuit are derived from the selected one of the first set of circuit components or the second set of circuit components.

7. The computer-implemented method of claim 1 further comprising mapping a stored hash value back to the circuit diagram by:
  storing data representative of each trace of the plurality of portions of the circuit diagram in association with a corresponding hash value;
  searching the data structure for the stored hash value; and
  recreating the respective portion of the circuit diagram based on the data representative of the trace associated with the stored hash value.

8. The computer-implemented method of claim 1, wherein the circuit diagram is a first circuit diagram of a first circuit having a first plurality of sub-circuits and the hash values are a first set of hash values, the method further comprising:
  generating a second set of hash values based on a second circuit diagram of a second circuit having a second plurality of sub-circuits; and
  determining a similarity measurement between the first circuit diagram and the second diagram by calculating a Jaccard Index of the first set of hash values and the second set of hash values.

9. The computer-implemented method of claim 8, further comprising:
  responsive to determining that the Jaccard Index exceeds a predetermined threshold, determining that the second circuit substantially matches the first circuit.

10. The computer-implemented method of claim 1, further comprising:
  generating an hash value representative of a sub-optimal circuit block;
  responsive to identifying one or more hash values stored in the data structure that match the hash value representative of the sub-optimal circuit block, identifying one or more corresponding sub-optimal circuit blocks of the circuit diagram; and
  modifying the circuit diagram to replace the one or more corresponding sub-optimal circuit blocks with an optimized circuit block.

11. A system comprising:
  a processor communicatively coupled to a memory, the processor configured to:
    for each of a plurality of portions of a circuit diagram of a circuit, trace, from a starting latch to one of one or more source latches, the respective portion of the circuit diagram to identify circuit components associated with the respective portion of the circuit diagram, wherein the circuit components comprise circuit elements and circuit connections;
    for each of the plurality of portions of the circuit diagram of the circuit, generate an ASCII representation of the respective identified circuit components;
    generate a plurality of hash values by applying a hashing function to each ASCII representation, wherein each hash value corresponds to one of the plurality of portions of the circuit diagram; and
    store the hash values in a data structure.

12. The system of claim 11, wherein the processor is further configured to:
  receive an indication of a plurality of failures in the circuit based on executing a test of the circuit; and
  identify a common cause of two or more of the plurality of failures in the circuit by:
    identify a set of hash values that correspond to portions of the circuit diagram that are associated with the plurality of failures in the circuit; and
    compare each of the set of hash values to one another to identify commonalities.

13. The system of claim 12, wherein executing the test of the circuit and identifying the common cause of two or more of the plurality of failures in the circuit is performed in O(1) time.

14. The system of claim 11, wherein tracing is performed depth-first in alphabetical order of pin names.

15. The system of claim 12, wherein tracing the respective portion of the circuit diagram to identify circuit components associated with the respective portion of the circuit diagram comprises:
  identifying a first set of circuit components that comprises only circuit elements and circuit connections; and
  identifying a second set of circuit components that comprises circuit elements, circuit connections and electrical parameters associated with circuit elements.

16. The system of claim 15, wherein the processor is further configured to select one of the first set of circuit components or the second set of circuit components to achieve a desired level of granularity of analysis, and wherein the set of hash values that correspond to portions of the circuit diagram that are associated with the plurality of failures in the circuit are derived from the selected one of the first set of circuit components or the second set of circuit components.

17. A computer program product comprising a computer readable storage medium having program instructions embodied therewith the program instructions executable by a computer processor to cause the computer processor to perform a method comprising:

for each of a plurality of portions of a circuit diagram of a circuit, tracing, from a starting latch to one of one or more source latches, the respective portion of the circuit diagram to identify circuit components associated with the respective portion of the circuit diagram, wherein the circuit components comprise circuit elements and circuit connections;

for each of the plurality of portions of the circuit diagram of the circuit, generating an ASCII representation of the respective identified circuit components;

generating a plurality of hash values by applying a hashing function to each ASCII representation, wherein each hash value corresponds to one of the plurality of portions of the circuit diagram; and storing the hash values in a data structure.

18. The computer program product of claim 17, wherein the method further comprises:

receiving an indication of a plurality of failures in the circuit based on executing a test of the circuit; and identifying a common cause of two or more of the plurality of failures in the circuit by:
identifying a set of hash values that correspond to portions of the circuit diagram that are associated with the plurality of failures in the circuit; and
comparing each of the set of hash values to one another to identify commonalities.

19. The computer program product of claim 18, wherein executing the test of the circuit and identifying the common cause of two or more of the plurality of failures in the circuit is performed in O(1) time.

20. The computer program product of claim 17, wherein tracing is performed depth-first in alphabetical order of pin names.

* * * * *